United States Patent [19]
Kato et al.

[11] Patent Number: 5,659,888
[45] Date of Patent: Aug. 19, 1997

[54] RADIO TELECOMMUNICATION APPARATUS

[75] Inventors: Syozi Kato, Hino; Noboru Koike, Tama, both of Japan

[73] Assignee: Kabushiki Kaisha Toshiba, Kanagawa, Japan

[21] Appl. No.: 325,403

[22] PCT Filed: Apr. 30, 1993

[86] PCT No.: PCT/JP93/00579
§ 371 Date: Nov. 4, 1994
§ 102(e) Date: Nov. 4, 1994

[87] PCT Pub. No.: WO93/22846
PCT Pub. Date: Nov. 11, 1993

[30] Foreign Application Priority Data

May 1, 1992 [JP] Japan ................ 4-029208

[51] Int. Cl.⁶ ........................ H04B 1/38
[52] U.S. Cl. ............ 455/575; 455/90; 455/99
[58] Field of Search .............. 455/89, 90, 127, 455/33.1, 99; 379/58, 59; 343/702

[56] References Cited

U.S. PATENT DOCUMENTS

| | | | |
|---|---|---|---|
| 4,325,142 | 4/1982 | Nakazawa | 455/95 |
| 4,325,143 | 4/1982 | Kerr | 455/89 |
| 5,175,869 | 12/1992 | Murata | 455/89 |
| 5,261,121 | 11/1993 | Hashimoto | 455/123 |
| 5,369,803 | 11/1994 | Hirasawa et al. | 455/127 |
| 5,442,814 | 8/1995 | Seo | 455/90 |
| 5,457,814 | 10/1995 | Myrskog et al. | 455/89 |

FOREIGN PATENT DOCUMENTS

| | | |
|---|---|---|
| 0412852A2 | 2/1991 | European Pat. Off. . |
| 2206765 | 1/1989 | United Kingdom . |

OTHER PUBLICATIONS

Patent Abstracts of Japan, vol. 15, No. 219 (E–1074), Jun. 5, 1991, JP3062758.
Patent Abstracts of Japan, vol. 7, No. 4 (E–151), Jan. 8, 1983, JP57164626.

*Primary Examiner*—Edward F. Urban
*Attorney, Agent, or Firm*—Finnegan, Henderson, Farabow, Garrett & Dunner, L.L.P.

[57] ABSTRACT

A radio telephone device (1) is provided with a reed switch (13) arranged between a radio section (12) and a rod antenna (15) in a telephone set main body (10), which connects the radio section (12) and the rod antenna (15) with each other when the telephone set main body (10) is separated from a car kit (20). The car kit is provided with a magnet (27) which magnetically energizes the reed switch (13) when the telephone set main body (10) is placed on the car kit (20) so that the reed switch (13) is turned into a mode where the radio section (12) and an external antenna (26) are connected to each other. Hence it is possible to execute switching the antenna line between the rod antenna (15) of the telephone set main body (10) and the external antenna (26) of the car kit (20) without inviting any increase in the consumption of electric current and without making the circuits more complicated.

25 Claims, 8 Drawing Sheets

RADIO TELECOMMUNICATION APPARATUS

TECHNICAL FIELD

The present invention relates to radio communication apparatus and more particularly to an antenna line switching structure in a radio communication apparatus including a mobile unit which is capable of making communications by itself and an adapter to which the mobile unit is removably attached, in which when the mobile unit is separated from the adapter, a first antenna in the mobile unit is used for communication but when the mobile unit is connected to the adapter, a second antenna in the adapter is used for communication.

BACKGROUND ART

As one of the conventional radio communication apparatus of this type, a radio telephone device A is shown in FIG. 8. The radio telephone device A is provided with a telephone set main body B as a mobile unit and a car kit C as an adapter.

The telephone set main body B is provided with a radio section (not shown) within its casing and a rod antenna Ba (a first antenna) extending outwardly which is used when the telephone set main body B is used as a portable telephone set.

The car kit C is fixed in a car and connected through an external cable D to an external antenna E (a second antenna). When the telephone set main body B is attached to the car kit C and connected with a connector cord Ca, the radio section (not shown) in the telephone set main body B and the external antenna E are connected to each other, whereby the telephone set main body B is used as a car-mounted telephone set with the use of the external antenna E.

As shown in parts (a) and (b) of FIG. 9, in the radio telephone device A, a high frequency relay R is used to switch an antenna line between the rod antenna Ba and the external antenna E.

The high frequency relay R is disposed within the casing of the telephone set main body B. Terminals a and b of the relay R are connected to a radio section F and the rod antenna Ba, respectively. When the telephone set main body B is disconnected from the car kit C, the terminals a and b are connected to each other through a movable spring contact Ra, whereby the radio section F is connected through the high frequency relay R to the rod antenna Ba so that telephonic communication is made through the rod antenna Ba.

When the telephone set main body B is attached to the car kit C and connected with the connector cord Ca, the external antennal E is connected to a terminal c of the relay R, as shown in the part (b) of FIG. 9. Supply of an electric current between coil terminals d and e of the relay R generates a magnetic field in a coil Rb which causes a movable spring contact Ra to be pulled downward, and the terminals a and c are connected to each other by the contact Ra. As a result, the radio section F is connected through the relay R to the external antenna E and telephonic communication is made through the antenna E.

In the conventional radio telephone device A, since the relay R is used to switch the antenna line between the rod antenna Ba and the external antenna E, as mentioned above, an electric current is required to be supplied through the coil Rb of the relay R when the antenna is switched and hence power consumption would increase disadvantageously.

In the conventional radio telephone device A, control means is required for detecting, when the telephone set main body B or connection of the external antenna E to the terminal c of the relay R so as to switchover the antenna line from the rod antenna Ba to the external antenna E and for supplying a current between the coil terminals d and e of the relay R. This would cause the circuitry to be complicated, disadvantageously.

DISCLOSURE OF THE INVENTION

It is therefore an object of the present invention to provide a radio telecommunication apparatus which is capable of switching an antenna line between a first antenna in a mobile unit and a second antenna in an adapter without inviting an increase in current consumption and complication of the circuitry.

In order to achieve the above object, in the present invention, a reed switch is provided between a radio section and a first antenna in a mobile unit for connecting the radio section with the first antenna when the mobile unit is separated from the adapter, and a magnet is provided in the adapter for exerting, when the mobile unit is attached to the adapter, a magnetic force on the reed switch to cause the reed switch to be actuated so as to connect the radio section with the second antenna.

According to the above-mentioned arrangement, the magnetic force of the magnet provided in the adapter causes the read switch provided in the mobile unit to be actuated so as to switch the antenna line without the use of a high frequency relay. Further, by attaching/removing the mobile unit to/from the adapter, the reed switch is actuated by the toward/away movement of the read switch relative to the magnet, whereby the switching of the antenna line is carried out without the use of separately provided control means.

BRIEF DESCRIPTION OF THE DRAWINGS

Parts (a) and (b) of FIG. 1 are conceptual side views of a radio telecommunication apparatus according to the present invention.

Figure 5A:
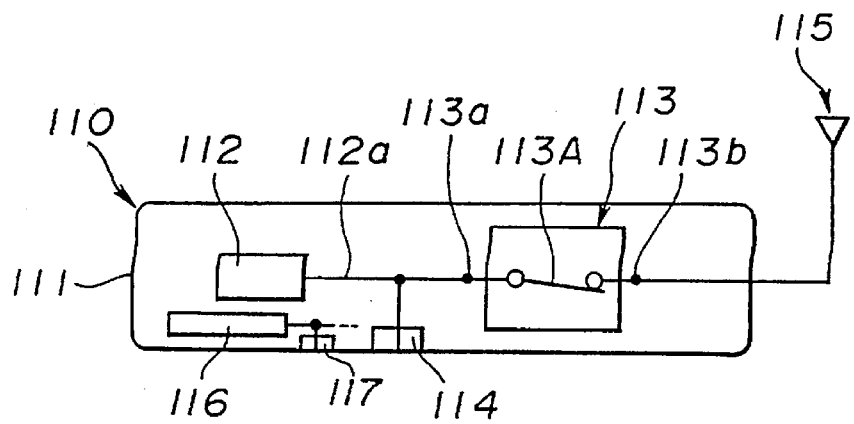
Figure 5B:
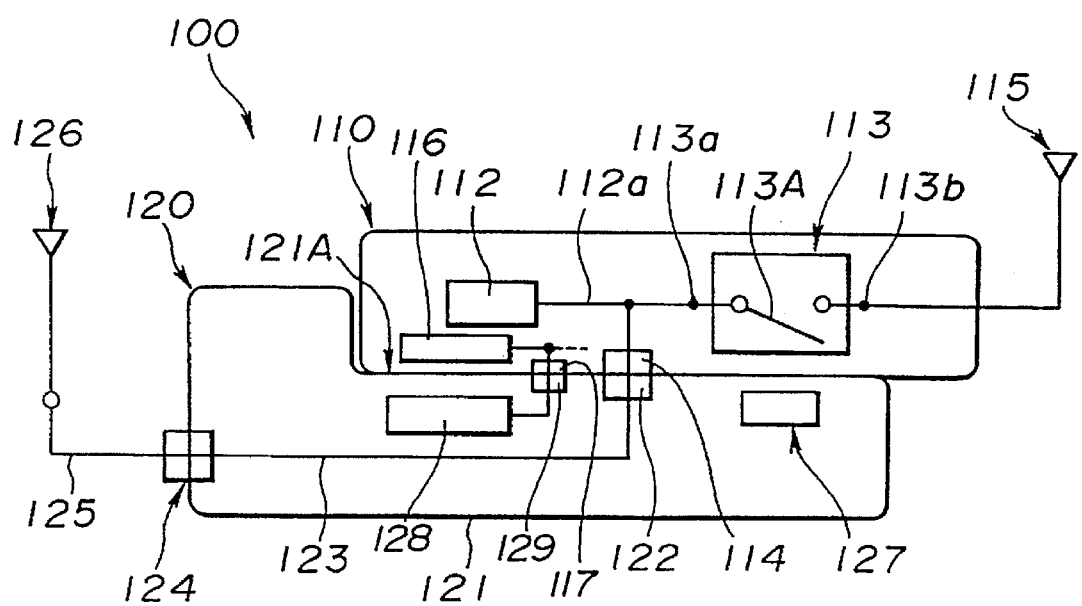

Parts (a) and (b) of FIG. 5 are conceptual side views of another embodiment of the radio telecommunication apparatus according to the present invention.

Figure 6A:
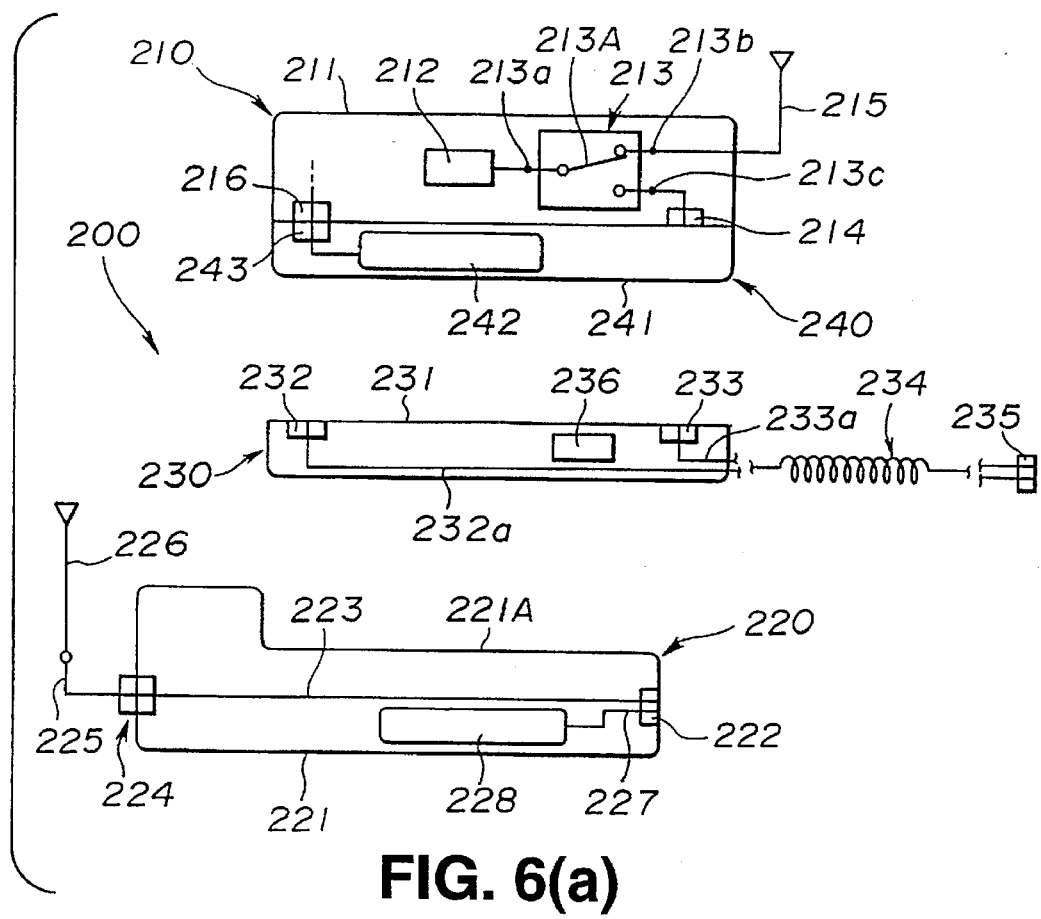
Figure 6B:
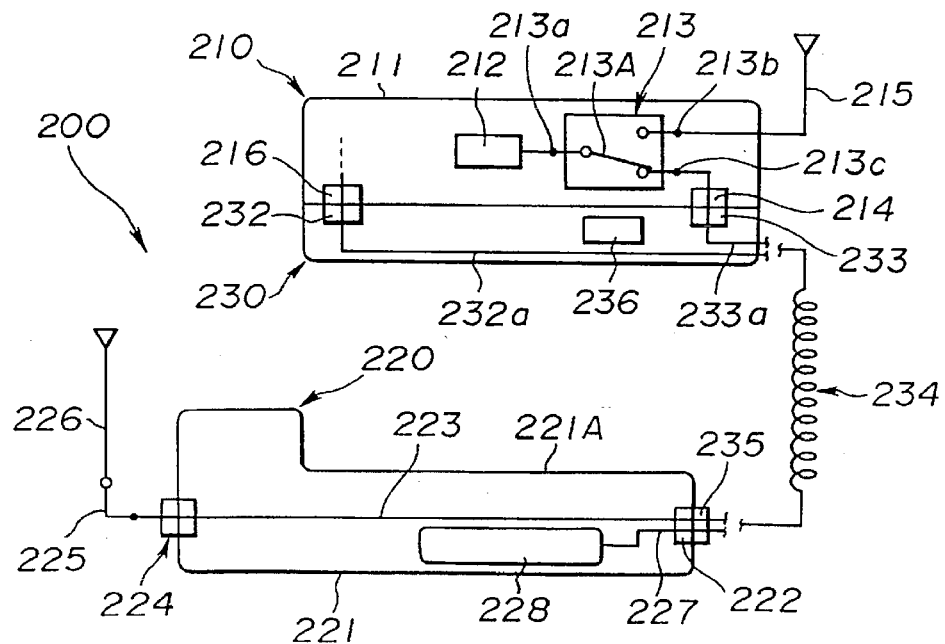

Parts (a) and (b) of FIG. 6 are conceptual side views of still another embodiment of the radio telecommunication apparatus according to the present invention.

Figure 7A:
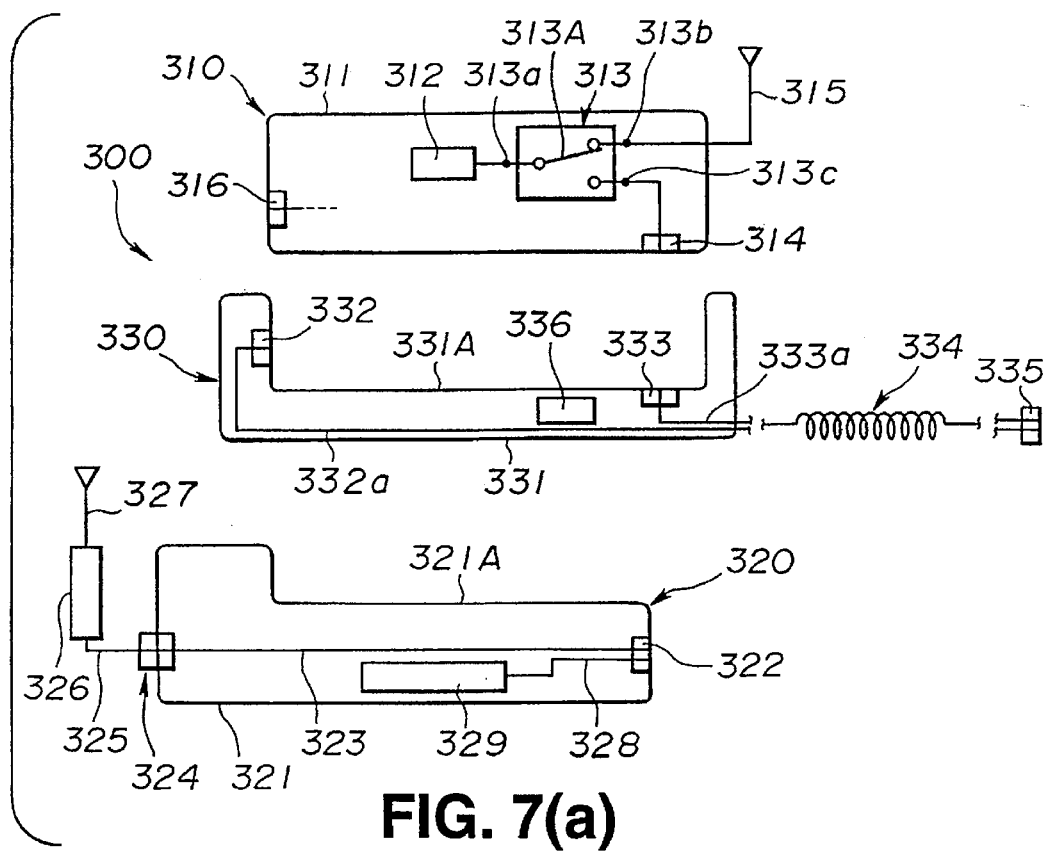
Figure 7B:
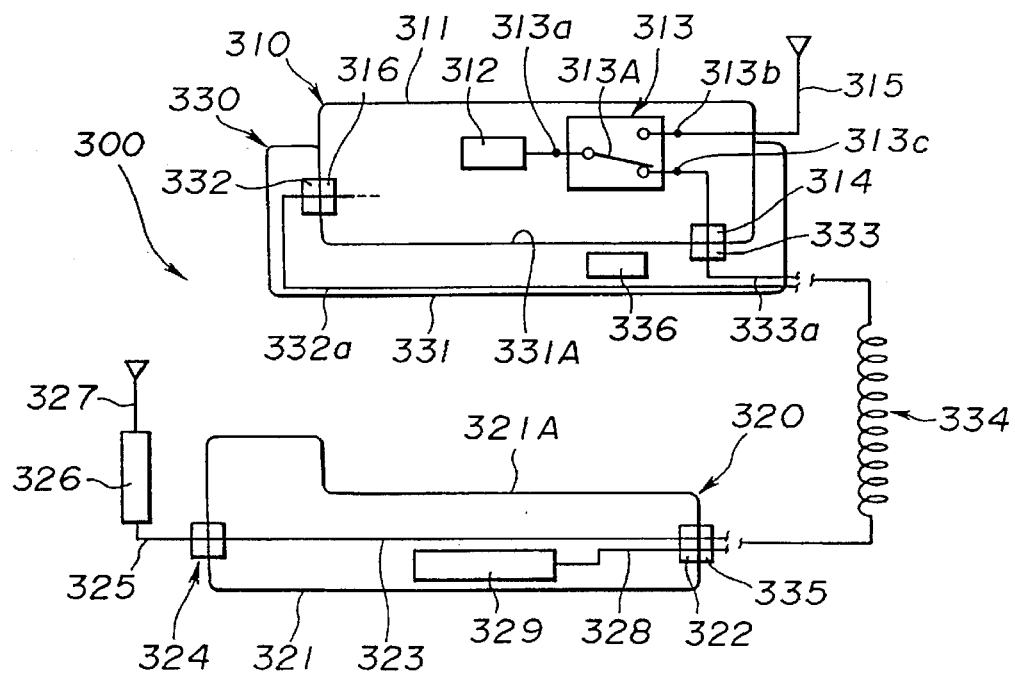

Parts (a) and (b) of FIG. 7 are conceptual side views of a further embodiment of the radio telecommunication apparatus according to the present invention.

Figure 8:
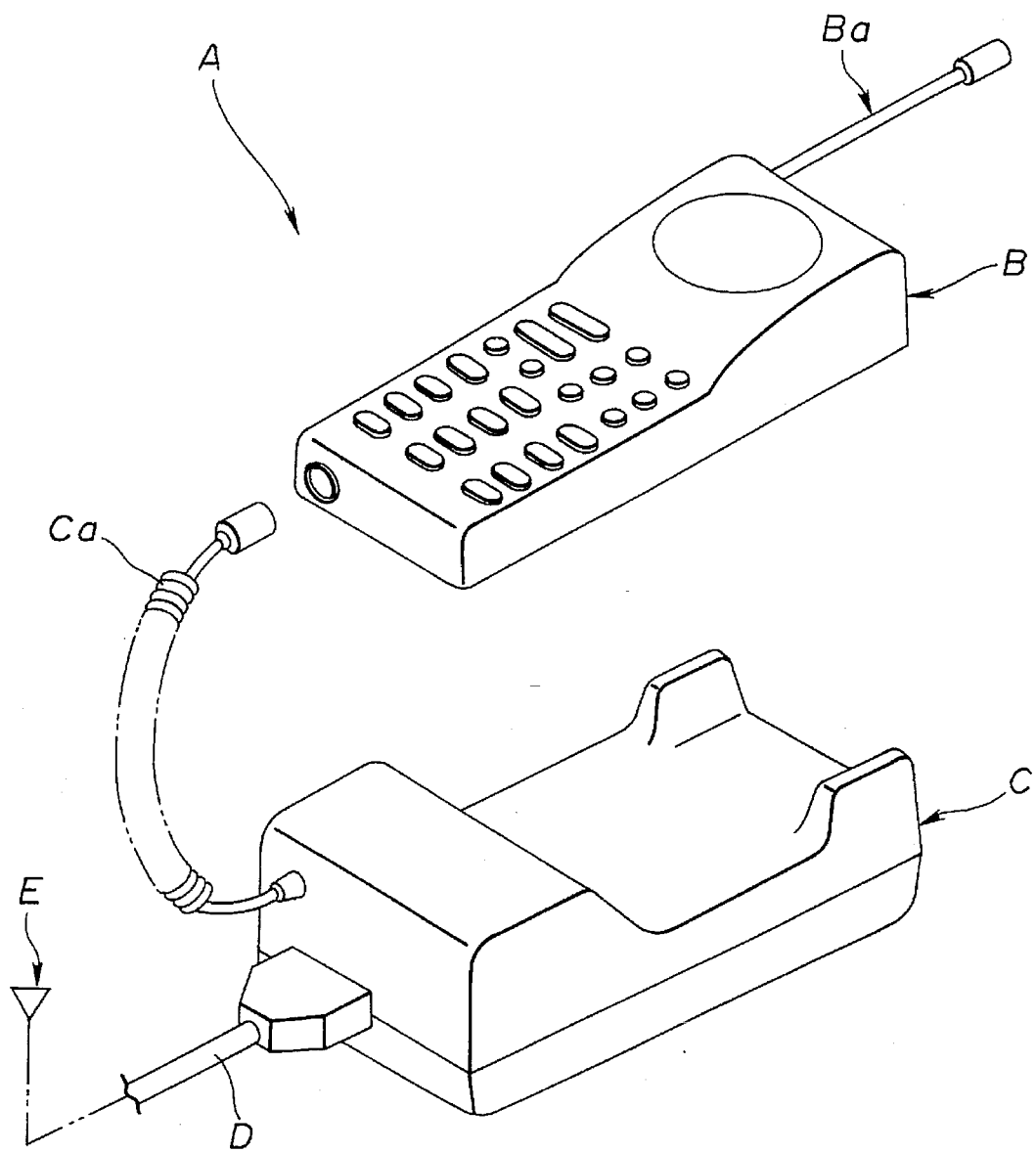

FIG. 8 is an exploded perspective view of a aspects of the operation of a high frequency relay used in the conventional radio telecommunication apparatus.

BEST MODE FOR CARRYING OUT THE INVENTION

Embodiments of the present invention will be described below in detail with respect to the drawings.

Figure 1A:
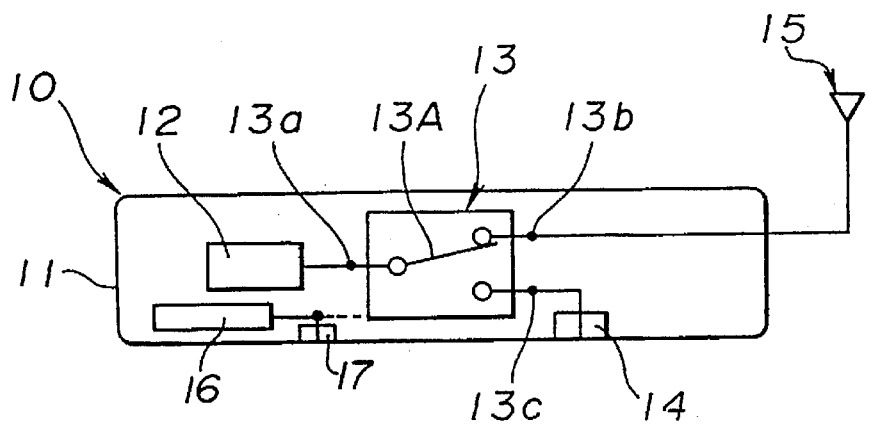
Figure 1B:
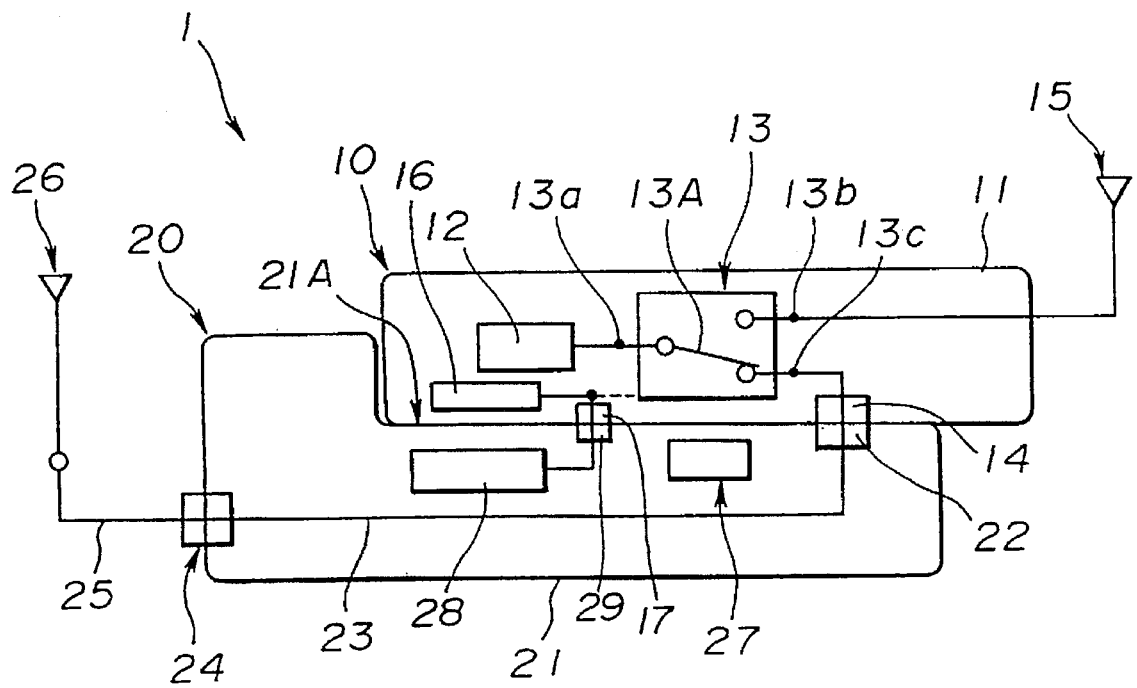
Figure 2:
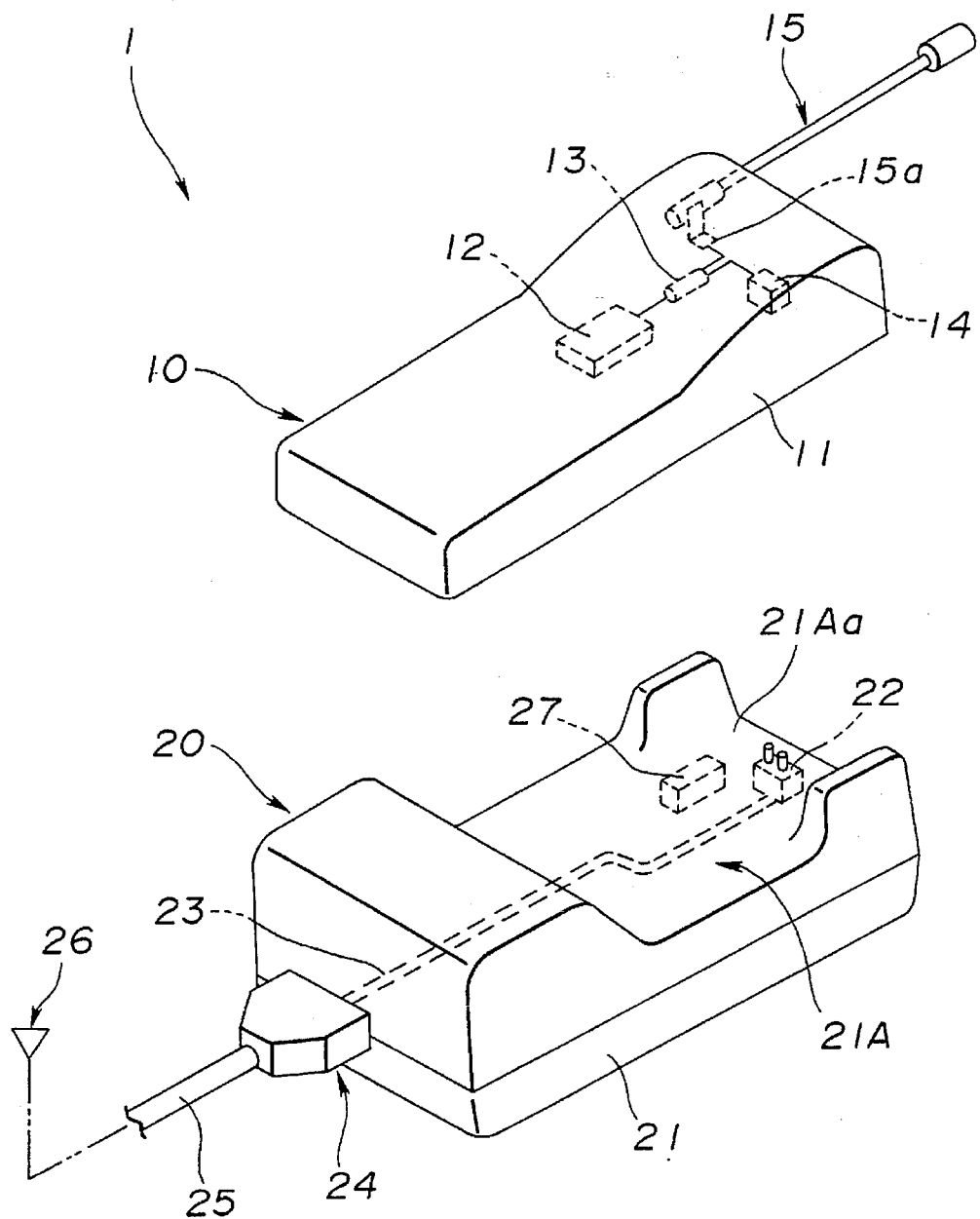
FIG. 2 is an exploded perspective view of the radio telecommunication apparatus according to the present invention.

FIGS. 1 and 2 show a radio telecommunication apparatus according to the present invention applied to a radio telephone device 1, which is provided with a telephone set main body 10 as a mobile unit and a car kit 20 as an adapter to which the telephone set main body 10 is removably attached.

The telephone set main body 10 is provided with a radio section 12, a reed switch 13, and a mobile unit side connector 14 as a first connector within a casing 11 and also provided with a rod antenna 15 as a first antenna.

As explicitly shown in FIG. 1, a terminal 13a of a reed switch 13 of a one-side 2-contact type (transfer type), more particularly, the terminal 13a connected to a reed 13A of the reed switch 13 is connected to an output line extending from the radio section 12, while a terminal 13b of the switch 13 is connected to a connection terminal 15a (FIG. 2) of the rod antenna 15.

A terminal 13c of the reed switch 13 is connected to the mobile unit side connector 14 which is so positioned as to be exposed to a surface of the casing 11 which is attached to a car kit 20, that is, to a back side (lower side in FIG. 1) of the casing 11.

Figure 3:
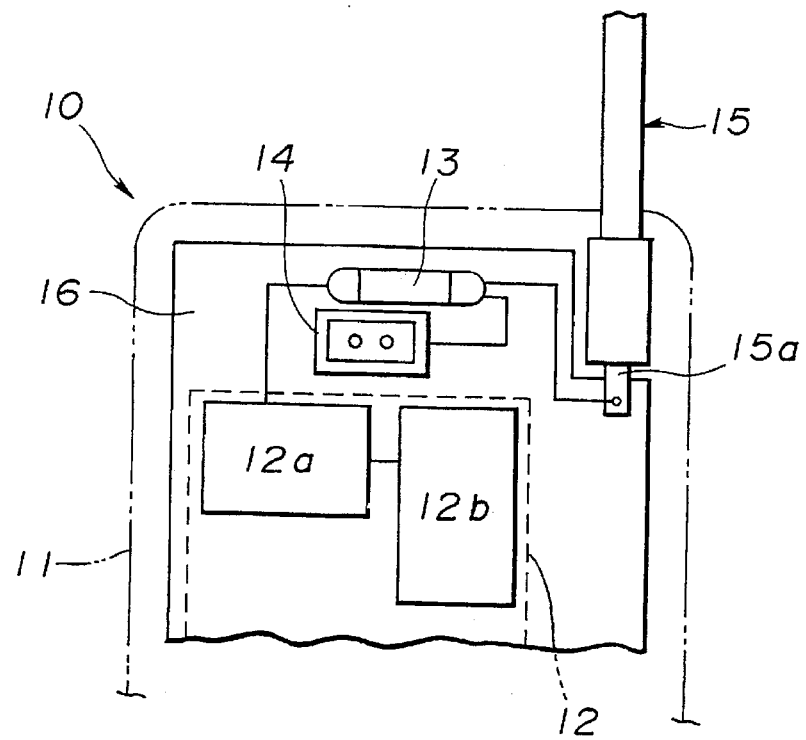
FIG. 3 is a conceptual back view of the essential portion of a wiring board of a telephone set main body of the radio telecommunication apparatus.

The radio section 12, reed switch 13, mobile unit side connector 14 and connection terminal 15a of the rod antenna 15 are disposed close to one another on a wiring board 16 accommodated within the casing 11, as shown in FIG. 3. The radio section 12 is provided with a duplexer 12a and an amplifier 12b and connected to a telephone transmitter/receiver (not shown), etc. as a matter of course.

The telephone set main body 10 has on its front side (upper side in the figure) a key operation unit, a transmitter, a receiver, etc., and the appearance is the same to the telephone set main body B of the conventional radio telephone set A shown in FIG. 8.

The car kit 20 is attached within a car and on an upper surface of a casing 21 thereof, a rest 21A for placing the telephone set main body 10 thereon is formed.

In the casing 21 of the car kit 20, an adapter side connector 22 as a second connector is provided as exposed to a mounting surface (upper surface in the figure) 21Aa of the rest 21A and is connected to an external antenna 26 as a second antenna through a cord 23 within the casing 21, a connector 24 provided in the casing 21 and an external cable 25.

Further, within the casing 21 of the car kit 20, a magnet 27 is provided for exerting a magnetic force from the outside on the reed switch 13 provided in the telephone set main body 10.

Figure 4:
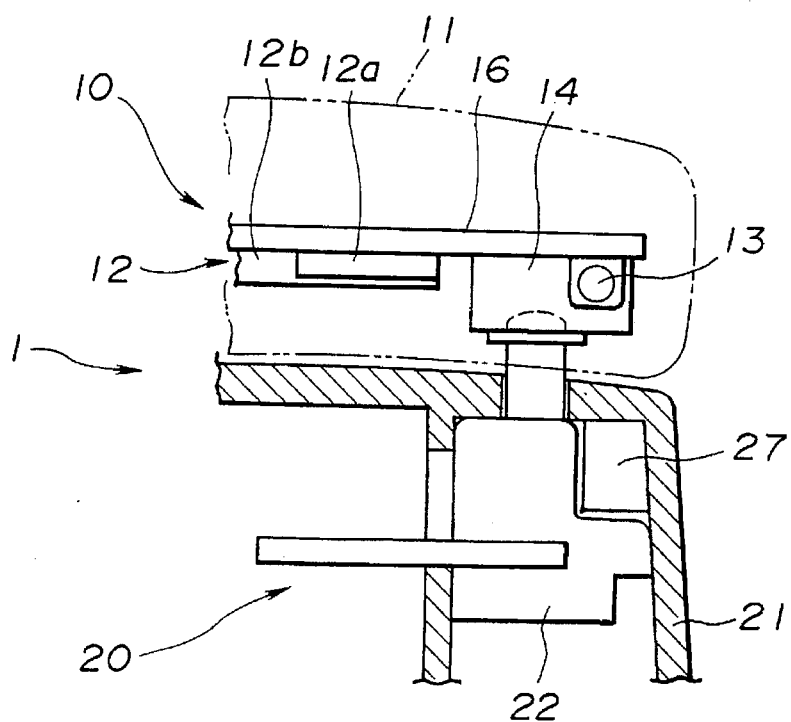
FIG. 4 is a conceptual cross-sectional side view of the essential portion of the telephone set main body of the radio telecommunication apparatus and a car kit.
Figure 3:
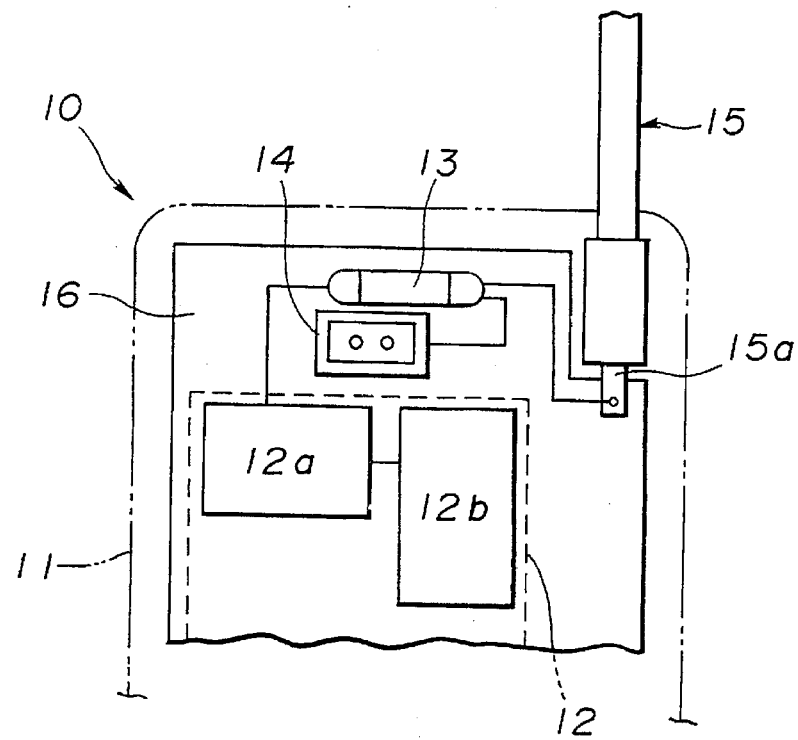
Figure 4:
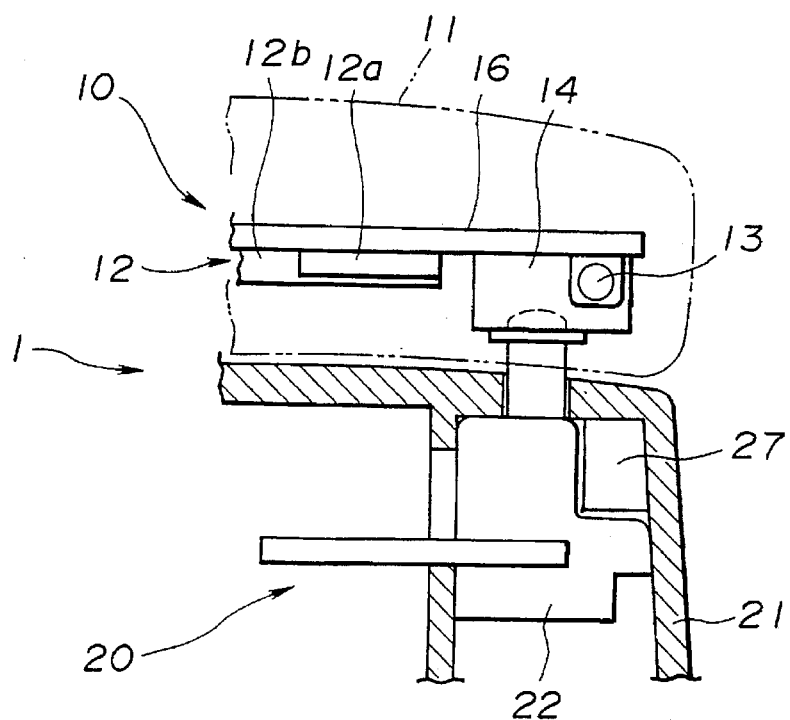

As shown in FIG. 4, the magnet 27 is fixedly placed at a position close to the adapter side connector 22 within the casing 21, that is, at a position where the magnet comes closest to the reed switch 13 when the telephone set main body 10 is placed on the rest 21A of the car kit 20. Further, the magnet 27 is immovably assembled within the casing 21 as being supported by the adapter side connector 22 fixed within the casing 21.

In the casing 11 of the telephone set main body 10, a battery 16 and a main body side power source connector 17 connected to the battery 16 are disposed, while in the casing 21 of the car kit 20, a power supply unit 28 and a car kit-side power source connector 29 are provided. The telephone set main body 10 is operated by the battery 16 when separated from the car kit 20, and when mounted on the car kit 20, the main body side power source connector 17 and the car kit side power source connector 29 are mutually connected, whereby the supply of power during a hands-free communication and charging of the battery 16 are carried out.

In the radio telephone device 1 having the above-mentioned configuration, when the telephone set main body 10 is separated from the car kit 20, the read 13A of the reed switch 13 is at a normal position where the terminals 13a and 13b are connected to each other, as shown in the part (a) of FIG. 1.

Thus, the radio section 12 of the telephone set main body 10 and the rod antenna 15 are connected through the reed switch 13, so that the telephone set main body 10 can be used by itself as a portable telephone set for telephonic communication with the use of the rod antenna 15.

As shown in the part (b) of FIG. 1, when the telephone set main body 10 is placed on the car kit 20, that is, the telephone set main body 10 is placed on the rest 21A, the mobile unit side connector 14 of the telephone set main body 10 is connected to the adapter side connector 22 of the car kit 20 and the reed switch 13 of the telephone set main body 10 is placed at a position close to the magnet 27 provided in the car kit 20.

Because the reed switch 13 is placed close to the magnet 27, the reed 13A of the reed switch 13 is drawn by the magnetic force of the magnet 27 to move from its normal position to a position where the terminals 13a and 13c are connected, as shown in the part (b) of FIG. 1, whereby the radio section 12 of the telephone set main body 10 is connected to the external antenna 26 through the reed switch 13, mobile unit side connector 14, adapter side connector 22, cord 23, connector 24 and external cable 25. Thus, the telephone set main body 10 can be used as a car-mounted telephone set for telephonic communication with the use of the external antenna 26.

In the above-mentioned radio telephone device 1, the magnetic force of the magnet 27 is predetermined such that the magnet 27 draws the reed 13A of the reed switch 13A only when the telephone set main body 10 is placed on the rest 21A and the mobile unit side connector 14 and the adapter side connector 22 are mutually connected and thus the telephone set main body 10 is placed at a predetermined mounting position relative to the car kit 20, that is, only when the telephone set main body 10 and the car kit 20 are at a predetermined relative position.

In other words, when the telephone set main body 10 is not securely mounted on the car kit 20, no magnetic force of the magnet 27 is exerted on the reed 13A. Thus, when the telephone set main body 10 being used as the portable telephone set is placed temporarily on the rest 21A of the car kit 20, the magnet 27 does not draw the reed 13A unless the adapter side connector 22 and the mobile unit side connector 14 are connected together and thus the telephone set main body 10 is connected to the car kit 20, whereby the use of the telephone set main body 10 as the portable telephone set is not hindered.

When the telephone set main body 10 is removed from the car kit 20, the connection between the mobile unit side connector 14 and the adaptor side connector 22 is disconnected and the reed switch 13 is isolated from the magnet 27, which means that the magnetic force of the magnet 27 is not exerted on the reed switch 13. As a result, the reed 13A returns to its normal position shown in the part (a) of FIG. 1 and thus the radio section 12 is connected with the rod antenna 15, whereby the telephone set main body 10 can be used by itself as the portable telephone set for telephonic communication.

As described above, in the radio telephone device 1, since the movement of the reed 13A toward/away from the magnet 27 caused by the attachment/removal of the telephone set main body 10 to/from the car kit 20 causes the switching operation of the switch 13, the antenna line is switched between the rod antenna 15 and the external antenna 26 without the use of a high frequency relay and without the need for a separately provided control means.

The radio telephone device 100 shown in FIG. 5 is provided with a telephone set main body 110 as a mobile unit and a car kit 120 as an adapter. The telephone set main body 110 contains within its casing 111 a radio section 112, a reed switch 113 and a mobile unit side connector 114 as a first connector, and also provided with a rod antenna 115 as a first antenna.

A terminal 113a connected to a reed 113A of the reed switch 113 is connected to an output line 112a extending from the wireless unit 112, while a terminal 113b connected to a fixed contact of the reed switch 113 is connected to the rod antenna 115. Further, the output line 112a extending from the radio section 112 is connected to the mobile unit side connector 114.

The mobile unit side connector 114 is disposed as being exposed to the back side (lower side in the figure) of the casing 111 of the telephone set main body 110, that is, being exposed to the surface to be placed on the car kit 120, and a key operation element, etc. (not shown) are disposed on a front side (upper side in the figure) of the casing 111.

The car kit 120 is attached within a car and has a casing 121 which includes a rest 121A formed on its upper surface and provided with an adapter side connector 122 as a second connector as being exposed to the rest 121A.

The adapter side connector 122 is connected to an external antenna 126 as a second antenna through a cord 123, a connector 124 and an external cable 125.

In the casing 121 of the car kit 120, a magnet 127 is disposed at a position where the magnet 127 comes closest to the reed switch 113 when the telephone set main body 110 is placed on the rest 121A.

In the casing 111 of the telephone set main body 110, a battery 116 and a main body side power source connector 117 connected to the battery 116 are disposed, while in the casing 121 of the car kit 120, a power supply 128 and a car kit side power source connector 129 connected to the power supply 128 are provided. The telephone set main body 110 is operated by the battery 116 when separated from the car kit 120 and, when the telephone set main body 110 is attached connector 117 and the car kit side power source connector 129 are mutually connected so that supply of power and charging of the battery 116 are carried out at the time of the hands-free communication.

In the radio telephone device 100, when the telephone set main body 110 is separated from the car kit 120, the reed 113A of the reed switch 113 is at a normal position where the terminals 113a and 113b are connected as shown in the part (a) of FIG. 5. Thus, the radio section 112 and the rod antenna 115 are connected to each other through the reed switch 113, and hence the telephone set main body 110 can by itself be used as a portable telephone set.

When the telephone set main body 110 is placed on the rest 121A of the car kit 120, the mobile unit side connector 114 and the adapter side connector 122 are connected to each other and the reed switch 113 is placed at a position close to the magnet 127. Thus, the reed 113A of the reed switch 113 is drawn by the magnetic force of the magnet 127 and deformed whereby the terminals 113a and 113b are separated from each other, as shown in the part (b) of FIG. 5. Thus, the radio section 112 is connected to the external antenna 126 through mobile unit side connector 114, adapter side connector 122, cord 123, connector 124 and external cable 125.

By attachment of the telephone set main body 110 to the car kit 120, the radio section 112 is disconnected from the rod antenna 115 and connected to the external antenna 126, so that the telephone set main body 100 can be used as the car-mounted telephone set for telephonic communication, with the use of the external antenna 126.

When the telephone set main body 110 is removed from the car kit 120, the adaptor side connector 122 is disconnected from the mobile unit side connector 114 and the reed switch 113 is moved away from the magnet 127. Thus, the reed 113A returns to its normal position, as shown in the part (a) of FIG. 5. Therefore, the radio section 112 and the rod antenna 115 are again connected and the telephone set main body 110 can be used by itself as the portable telephone set.

As described above, since in the radio telephone device 100 of FIG. 5 the reed switch 113 is switched by the magnetic force of the magnet 127 along with the attachment/removal of the telephone set main body 110 to/from the car kit 120, the antenna line is switched between the rod antenna and the external antenna without the use of a high frequency relay and the need for separate control means.

The radio telephone set 200 shown in the parts (a) and (b) of FIG. 6 is provided with a telephone set main body 210 as a mobile unit, and a car kit 220 and an adapter 230 as adapters. The car kit 220 serves as a first adapter, the adapter 230 serves as a second adapter, and the car kit 220 serves as a fixing member for fixing the adapter 230.

The telephone set main body 210 has within its casing 211 a radio section 212, a reed switch 213, and a mobile unit side connector 214. The casing 211 is provided with a rod antenna 215 as a first antenna, a key operation unit (not shown) on its front side (upper side in the figure), and a battery pack 240 on its back side (lower side in the figure).

The battery pack 240 is configured as a member to be removably attached to the telephone set main body 210 and has within its casing 241 a battery 242 and a pack side power supply connector 243 connected to the battery 242. When the battery pack 240 is attached to the telephone set main body 210, the main body side power supply connector 216 provided on the casing 211 of the telephone set main body 210 is interconnected to the pack side power supply connector 243 to thereby supply power to the telephone set main body 210.

The terminal 213a of the reed switch 213 provided within the casing 211 is connected to an output line extending from the radio section 212; the terminal 213b is connected to the rod antenna 215; the terminal 213c is connected to the mobile unit side connector 214 as a first connector (first connecting means), which is provided exposed in the back of the casing 211.

The car kit 200 is attached within the car; the casing 221 has a rest 221A on its upper surface for placing the telephone set main body 210 thereon; and a car kit side connector 222 is provided within the casing 221 as being exposed to an end (right-hand side in the figure).

The car kit side connector 222 is connected to an external antenna 226 as a second antenna through a cord 223, connector 224 and external cable 225 and also to the power supply 228 through a power supply cable 227.

The adapter 230 is attached removably to the telephone set main body 210 as same to the battery pack 240 and is provided with an adapter side power supply connector 232 and an adapter side connector 233 as the second connector within the casing 231 thereof.

The adapter side power supply connector 232 and the adapter side connector 233 are connected to the body side power supply connector 216 and mobile unit side connector 214, respectively, provided in the telephone set main body 210 when the adapter 230 is attached to the telephone set main body 210.

The adapter side power supply connector 232 and the adapter side connector 233 are connected to a curl cord 234 as a wire through cords 232a and 233a running through within the casing 231. The curl cord 234 extends outside the casing 231 and has at one end an adapter side connector 235 connectable to the car kit side connector 222 in the car kit 220.

The adapter side connector 233, curl cord 234 and adapter side connector 235 constitute the second connecting means to the mobile unit side connector 214 as the first connecting means in the telephone set main body 210. The adapter side connector 233 and the adapter side connector 235 respectively constitute the first connector and the second connector in the second connecting means.

A magnet 236 is provided within the casing 231 of the adapter 230 such that the magnet 236 is placed at a position that becomes closest to the reed switch 213 provided within the casing 211 of the telephone set main body 210 when the adapter 230 is attached to the back surface of the telephone set main body 210 in place of the battery pack 240.

In the radio telephone device 200, as shown in the part (a) of FIG. 6, when the battery pack 240 is attached to the telephone set main body 210, the reed 213A of the reed switch 213 is at a normal position where the terminals 213a and 213b are connected. Thus, the radio section 212 and the rod antenna 215 in the telephone set main body 210 are connected to each other through the reed switch 213, so that the telephone set main body 210 can by itself be used as a portable telephone set for telephonic communication with the use of the rod antenna 215.

When no communication is made, the telephone set main body 210 is placed together with the battery pack 240 on the rest 221A of the car kit 220, and the battery 242 is charged through a connector (not shown) provided between the car kit 220 and the battery pack 240.

When the battery pack 240 is removed from the telephone set main body 210 and the adapter 230 is instead attached to the telephone set main body 210 as shown in the part (b) of FIG. 6, and the adapter side connector 235 of the adapter 230 is connected to the car kit side connector 222 of the car kit 220, the adapter side power supply connector 232 and the adapter connector 233 are connected to the main body side power supply connector 216 and the mobile unit side connector 214, respectively, and the reed switch 213 provided in the telephone set main body 210 and the magnet 236 provided in the adapter 230 are placed close to each other.

Thus, the reed 213A of the reed switch 213 is drawn by the magnetic force of the magnet 236 to move from its normal position to a position where the terminals 213a and 213c are connected, as shown in the part (b) of FIG. 6. Therefore, the radio section 212 of the telephone set main body 210 is connected to the external antenna 226 through the reed switch 213, mobile unit side connector 214, adapter side connector 233, cord 233a, curl cord 234, adapter side connector 235, car kit side connector 222, cord 223, connector 224, and external cable 225 whereby a high frequency signal is transmitted through the above-mentioned route connecting the radio section 212 and the external antenna 226. Thus, the telephone set main body 210 can be used as a car-mounted telephone set for telephonic communication with the use of the external antenna 226.

By attachment of the adapter 230 to the telephone set main body 210, the power supply 228 of the car kit 220 feeds power to the telephone set main body 210 through the power supply cable 227, car kit side connector 222, adapter side connector 235, curl cord 234, cord 232a, and adapter side power supply connector 232.

When the hands-free telephonic communication is made or no communication is made, the telephone set main body 210 may be placed on the rest 221A of the car kit 220 through the adapter 230.

While in the radio telephone device 200 the one-side two-contact type reed switch 213 is used for switching the antenna line, a reed switch with a single movable contact and a single fixed contact may be used, of course, as in the radio telephone device 100 of FIG. 5.

The radio telephone device 300 shown in the parts (a) and (b) of FIG. 7 is provided with a telephone set main body 310 as a mobile unit, and a car kit 320 and a catcher 330 as adapters. The car kit 320 constitutes a first adapter, the catcher 330 constitutes a second adapter, and the car kit 320 constitutes a fixing member for fixing the catcher 330.

The telephone set main body 310 has within its casing 311 a radio section 312, a reed switch 313, and a mobile unit side connector 314 as a first connector (first connecting means). The casing 311 is provided with a rod antenna 315 as a first antenna, and a key operation unit, etc. (not shown) on its front side (upper side in the figure).

A terminal 313a of the reed switch 313 provided within the casing 311 is connected to an output line extending from the radio section 312; a terminal 313b is connected to a rod antenna 315; a terminal 313c is connected to the mobile unit side connector 314, which is provided exposed in the back of the casing 311.

The car kit 320 is attached within the car; the casing 321 has a rest 321A on its upper surface for placing the telephone set main body 310 thereon; and a car kit side connector 322 is provided within the casing 321 as being exposed to one end (right-hand side in the figure).

The car kit side connector 322 is connected to an external antenna 327 as a second antenna through a cord 323, connector 324, external cable 325 and a booster 326 and also to a power supply 329 through a power supply cable 328.

The catcher 330 has on the upper surface of its casing 331 a rest 331A for placing the telephone set main body 310 thereon and a locking mechanism (not shown) for locking the telephone set main body 310 placed on the rest 331A. A catcher side power supply connector 332 and an adapter side connector 333 as the second connector are provided exposed to the rest 331A within the casing 331.

The catcher side power supply connector 332 and the adapter side connector 333 are connected to the main body side power supply connector 316 and mobile unit side connector 314, respectively, provided in the telephone set main body 310 when the catcher 330 is connected to the telephone set main body 310.

The catcher side power supply connector 332 and the adapter side connector 333 are connected to a curl cord 334 through cords 332a and 333a running through within the casing 331. The curl cord 334 has at one end a catcher side connector 335 connected to the car kit side connector 322 in the car kit 320.

The adapter side connector 333, curl cord 334 and catcher side connector 335 constitute the second connecting means to the mobile side connector 314 as the first connecting means in the telephone set main body 310. The adapter side connector 333 and the catcher side connector 335 respectively constitute the first and second connectors in the second connecting means.

A magnet 336 is provided within the casing 331 of the catcher 330 at a position that becomes closest to the reed switch 313 provided within the casing 311 of the telephone set main body 310 when the telephone set main body 310 is attached to the rest 331A of the casing 331.

When in the radio telephone device 300 the catcher 330 is separated from the telephone set main body 310, as shown in the part (a) of FIG. 7, the reed 313A of the reed switch 313 is at a normal position where the terminals 313a and 313b are connected. Thus, the radio section 312 and the rod antenna 315 in the telephone set main body 310 are connected to each other through the reed switch 313, so that the telephone set main body 310 can by itself be used as a portable telephone set for telephonic communication with the use of the rod antenna 315.

Attachment of the telephone set main body 310 to the car kit 320 enables the hands-free telephonic communication and the telephone set main body 310 is charged through the connectors (not shown) provided between the telephone set main body 310 and the car kit 320.

When the telephone set main body 310 is attached to the catcher 330 as shown in the par (b) of FIG. 7, and the catcher side connector 335 of the catcher 330 is connected to the car kit side connector 322 of the car kit 320, the catcher side power supply connector 332 and the adapter side connector 333 are connected to the main body side power supply connector 316 and the mobile unit side connector 314, respectively, and the reed switch 313 provided in the telephone set main body 310 and the magnet 336 provided in the catcher 330 are placed close to each other. Thus, the reed 313A of the reed switch 313 is drawn by the magnetic force of the magnet 336 to move from the normal position to a position where the terminals 313a and 313c are connected, as shown in the part (b) of FIG. 7. Thus, the radio section 312 of the telephone set main body 310 is connected to the external antenna 327 through the reed switch 313, mobile unit side connector 314, adapter side connector 333, cord 333a, curl cord 334, catcher side connector 335, car kit side connector 322, cord 323, connector 324, external cable 325 and booster 326 whereby a high frequency signal is transmitted through the above-mentioned route connecting the radio section 312 and the external antenna 327. Thus, the telephone set main body 310 can be used as a car-mounted telephone set for telephonic communication with the use of the external antenna 327.

By attachment of the catcher 330 to the telephone set main body 310, the power supply 329 of the car kit 320 feeds operating power to the telephone set main body 310 through the power supply cable 328, car kit side connector 322, catcher side connector 335, curl cord 334, cord 332a, and catcher side power supply connector 332.

When the hands-free telephonic communication is made or no communication is made, the telephone set main body 310 may be placed on the car kit 320 through the catcher 330.

While in the radio telephone device 300 the one-side two-contact type reed switch 313 is used for switching the antenna line, a reed switch with a single movable contact and a single fixed contact may be used as in the radio telephone device 100 of FIG. 5.

As mentioned above, also in the radio telephone devices 200 and 300 of FIGS. 6 and 7, the reed switch is switched with the magnetic force of the magnet when the adapter is attached/removed to/from the telephone set main body. Thus, the antenna line is switched between the rod antenna and the external antenna without the need for a high frequency relay and separate control means.

It goes without saying that the radio telecommunication apparatus of the present invention is applicable effectively to not only the radio telephone devices illustrated as the embodiments herein but also other various radio devices where the antenna line is required to be switched between the mobile unit and the adapter.

We claim:

1. A radio telecommunication apparatus including a mobile unit having a radio section and a first antenna, and an adapter having a second antenna and being provided with the mobile unit thereon, wherein when the mobile unit is separated from the adapter, the first antenna is used for communication while when the mobile unit is attached to the adapter, the second antenna is used for communication;

the mobile unit having a reed switch provided between the radio section and the first antenna for connecting the radio section with the first antenna when the adapter is separated from the mobile unit; and the adapter having a magnet for forcing the reed switch to be switched by a magnetic force of the magnet so as to connect the radio section with the second antenna when the mobile unit is attached to the adapter.

2. The radio telecommunication apparatus according to claim 1, wherein when the mobile unit is separated from the adapter, the reed switch connects the radio section with the first antenna and disconnects the radio section from the second antenna while when the mobile unit is attached to the adapter, the reed switch disconnects the radio section from the first antenna and connects the radio section with the second antenna.

3. The radio telecommunication apparatus according to claim 1, wherein when the mobile unit is separated from the adapter, the reed switch connects the radio section with the first antenna while when the mobile unit is attached to the adapter, the reed switch disconnects the radio section from the first antenna and connects the radio section with the second antenna.

4. The radio telecommunication apparatus according to claim 1, wherein the magnet has the magnetic force of such a degree that is capable of switching the reed switch only when the mobile unit is attached to the adapter.

5. The radio telecommunication apparatus according to claim 1, wherein the mobile unit comprises a first connector to be connected to the radio section when the mobile unit is connected to the adapter and wherein the adapter comprises a second connector connected to the second antenna and to be connected to the first connector when the mobile unit is attached to the adapter.

6. The radio telecommunication apparatus according to claim 5, wherein the reed switch has a movable contact connected to the radio section and a pair of fixed contacts including one contact connected to the first antenna and the other contact connected to the first connector.

7. The radio telecommunication apparatus according to claim 5, wherein the reed switch has contacts including one contact connected to the radio section and the first connector and the other contact connected to the first antenna.

8. The radio telecommunication apparatus according to claim 5, wherein the reed switch and the magnet are disposed in the mobile unit and the adapter, respectively, so as to be close to each other when the first connector and the second connector are connected with each other to attach the mobile unit to the adapter.

9. The radio telecommunication apparatus according to claim 1, wherein the adapter comprises a first adapter having the second antenna connected thereto, and a second adapter removably attached to the mobile unit, the second adapter having the magnet and being connected with the second antenna through the first adapter.

10. The radio telecommunication apparatus according to claim 9, wherein the first adapter is a fixing member for fixing the second adapter.

11. The radio telecommunication apparatus according to claim 9, wherein the second adapter is removably attached to the mobile unit in place of a member removably attached to the mobile unit.

12. The radio telecommunication apparatus according to claim 11, wherein the member is a battery pack.

13. The radio telecommunication apparatus according to claim 9, further comprising a wire for connecting the first adapter with the second adapter and for transmitting a high frequency signal.

14. The radio telecommunication apparatus according to claim 13, wherein the wire further transmits a power source signal.

15. A radio telecommunication apparatus including a mobile unit having a radio section and a first antenna, and an adapter having a second antenna and being provided with the mobile unit, comprising:

a magnet provided in the adapter;

first connecting means provided in the mobile unit;

switching means provided in the mobile unit, for connecting the radio section to the first antenna and disconnecting the radio section from the first connecting means when the mobile unit is being separated from the adapter, and for disconnecting the radio section from the first antenna and connecting the radio section to the first connecting means in response to a magnet force of the magnet when the mobile unit is attached to the adapter; and second connecting means provided in the adapter and connected to the second antenna, the second connecting means being connected to the first connecting means when the mobile unit is attached to the adapter.

16. A radio telecommunication apparatus including a mobile unit having a radio section and a first antenna, and an adapter having a second antenna and being provided with the mobile unit, comprising:

a magnet provided in the adapter;

first connecting means provided in the mobile unit and connected to the radio section;

switching means provided in the mobile unit, for connecting the radio section to the first antenna when the mobile unit is separated from the adapter, and for disconnecting the radio section from the first antenna in response to a magnetic force the magnet when the mobile unit is attached to the adapter; and second connecting means provided in the adapter and connected to the second antenna, the second connecting means being connected to the first connecting means when the mobile unit is attached to the adapter.

17. The radio telecommunication apparatus according to claim 16, wherein the switching means comprises a reed switch.

18. The radio telecommunication apparatus according to claim 15 or 16, wherein the adapter comprises a first adapter connected to the second antenna and a second adapter removably attached to the mobile unit, the second adapter having the magnet and being connected to the second antenna through the first adapter.

19. The radio telecommunication apparatus according to claim 18, wherein the first adapter is a fixing member for fixing the second adapter.

20. The radio telecommunication apparatus according to claim 18, wherein the second adapter is removably attached to the mobile unit in place of a member removably attached to the mobile unit.

21. The radio telecommunication apparatus according to claim 20, wherein the member is a battery pack.

22. The radio telecommunication apparatus according to claim 18, further comprising a wire for connecting the first and second adapters and for transmitting a high frequency signal.

23. The radio telecommunication apparatus according to claim 22, wherein the wire further transmits a power source signal.

24. The radio telecommunication apparatus according to claim 15 or 16, wherein the second connecting means is a connector which is connected to the first connecting means.

25. The radio telecommunication apparatus according to claim 15 or 16, wherein the second connecting means comprises a first connector connected to the first connecting means, a wire connected to the first connector, and a second connector connected to the wire and also connected to the second antenna.

* * * * *